US012055500B1

(12) United States Patent  (10) Patent No.: US 12,055,500 B1
Jau  (45) Date of Patent: Aug. 6, 2024

(54) DETECTION AND IMAGING OF ELECTRIC FIELDS, USING POLARIZED NEUTRONS

(71) Applicant: National Technology & Engineering Solutions of Sandia, LLC, Albuquerque, NM (US)

(72) Inventor: Yuan-Yu Jau, Albuquerque, NM (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 193 days.

(21) Appl. No.: 17/740,504

(22) Filed: May 10, 2022

Related U.S. Application Data

(60) Provisional application No. 63/197,610, filed on Jun. 7, 2021.

(51) Int. Cl.
   *G01N 23/04* (2018.01)
   *G01N 23/09* (2018.01)

(52) U.S. Cl.
   CPC ............ *G01N 23/04* (2013.01); *G01N 23/09* (2013.01); *G01N 2223/04* (2013.01); *G01N 2223/40* (2013.01); *G01N 2223/505* (2013.01)

(58) Field of Classification Search
   None
   See application file for complete search history.

(56) References Cited

U.S. PATENT DOCUMENTS

| 11,199,512 B2* | 12/2021 | Sarenac | G21K 1/02 |
| 2010/0025594 A1* | 2/2010 | Nukatsuka | G01T 3/00 |
| | | | 250/390.1 |

OTHER PUBLICATIONS

Jau, Y.-Y. et al., "Sensitive Neutron Transverse Polarization Analysis Using a 3He Spin Filter," Rev. Sci. Instrum. 91, 073303 (2020), pp. 073303-1-073303-11.
Jau, Y-Y et al., "Electric Field Imaging Using Polarized Neutrons," Physical Review Letters 125, 110801 (2020), pp. 110801-1-110801-5.

* cited by examiner

*Primary Examiner* — Hoon K Song
(74) *Attorney, Agent, or Firm* — Mark A. Dodd

(57) ABSTRACT

A method and corresponding apparatus are provided for measuring neutron spin precession in an electric field with high sensitivity suitable for practical applications in non-destructive testing, imaging, and the like. Production of a neutron beam with a polarization vector P is followed by transmitting the spin-polarized neutron beam through a sample region in which there is a target generating an electric field, polarization-analyzing the transmitted neutron beam with an analyzing direction orthogonal to P, detecting an intensity of the polarization-analyzed neutron beam; and mapping the detected neutron-beam intensity to a field-strength value for the target electric field.

20 Claims, 4 Drawing Sheets

DETECTION AND IMAGING OF ELECTRIC FIELDS, USING POLARIZED NEUTRONS

RELATED APPLICATIONS

This application claims priority to U.S. Provisional Application No. 63/197,610, filed on Jun. 7, 2021, and entitled DETECTION AND IMAGING OF ELECTRIC FIELDS, USING POLARIZED NEUTRONS, the entirety of which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

TECHNICAL FIELD

The invention relates to nondestructive methods of sensing and imaging that use beams of penetrating radiation to probe targets of interest. The invention relates more particularly to methods in which the probes are constituted by beams of polarized neutrons.

BACKGROUND

Beams of penetrating radiation have long been used as probes for imaging and diagnosing targets that are inaccessible to direct, nondestructive inspection. X-ray beams, for example, have well-established applications in many fields for imaging and diagnosis.

Neutron beams have also attracted interest for sensing applications. Neutrons offer some special advantages. For example, a neutron beam is more penetrative of metallic materials than an x-ray beam of the same particle energy. Also, neutrons can be used to directly sense electromagnetic fields through the interaction between the field and the neutron's magnetic moment. Further, neutron beams can be prepared in different energetic regimes, typically distinguished as the ultracold, thermal, and fast regimes, which each afford different benefits for sensing applications.

One very promising application of neutron sensing is to detect electronic activity and the energy state of hidden electronic circuitry. This application offers great strategic and practical benefits. For example, it could be used in surveillance to identify suspect malicious electronic devices, and could even be used in efforts to determine the functionalities of such devices.

In other applications, neutron sensing could be used to diagnose known, but physically isolated, electronic devices. Diagnosing voltage, charge-difference, or current conditions, for example, could lead to functional inferences useful for maintenance, and could be performed while the electronic system is intact and in operation.

The phenomenon that reveals circuit activity and electrical energy states is the generation of electric fields (E-fields) and magnetic fields (B-fields) by active electronic circuitry. If the circuitry is completely enclosed by an electromagnetically shielded box, i.e., an enclosure made of an electrically conductive material of high magnetic permeability, no E-fields or B-fields will be detectable outside the enclosure. Neutron beams are especially useful in this regard because they can be used to penetrate the shield barrier, interact directly with the electromagnetic field, and transport information about the field to a detector external to the box, a capability not possible with prior art technologies.

As noted above, the neutron has a magnetic moment. The neutron also has spin, and the magnetic moment lies along the spin direction. Because it has a magnetic moment, the neutron is subject to spin precession when it experiences a magnetic field that is at least partially perpendicular to the spin axis. Therefore, a spin-polarized beam of neutrons having an initial polarization vector, when it enters an electromagnetic field region, may exit the region with a final polarization vector that is rotated relative to the initial vector.

Neutron polarimetry is useful for detecting this rotation. More generally, neutron polarimetry is a technique that utilizes a neutron beam as a probe to retrieve specific information from a diagnostic target. The target must be characterized by some material or physical mechanism that rotates the neutron spin or alters the neutron trajectory in a manner that depends on the spin state.

In a typical arrangement for neutron polarimetry, a neutron spin analyzer is used to convert polarization rotation to neutron beam intensity. A detector then converts the neutron beam intensity to an electrical output signal. Although non-imaging detectors are more common, imaging arrangements for neutron detectors have also been demonstrated.

As those skilled in the art will appreciate, neutron-detection methods typically involve materials with high neutron cross section, such as helium-3 (He-3), lithium fluoride:zinc sulfide (LiF:ZnS), and compounds of gadolinium (Gd). The He-3 detector, for example converts incident neutrons directly to detectable charged particles that produce electrical counting signals. For imaging applications, a sheet of scintillator material, for example, LiF:ZnS, can be used to convert neutrons to photons, which then can be detected by a conventional optical camera.

One important benchmark of neutron polarimetry is the spin-angle resolution, i.e., the smallest change of the neutron-spin orientation that can be detected. The change in spin orientation, i.e., the precession angle, is proportional to the strength of the field being sensed. Therefore, the spin-angle resolution is directly related to the sensitivity of neutron polarimetry when it is being used for sensing electromagnetic fields.

Mathematically, the precession angle $\theta_{spm}$ due to a magnetic field B is at most $\theta_{spm}=(\gamma_n l/v)B$, depending on the relative vector orientations. Here, $\gamma_n=1.83\times10^8$ radians/second-tesla is the neutron gyromagnetic ratio, l is the characteristic length of the field region, and v is the neutron velocity. By contrast, the precession angle $\theta_{spe}$ of a neutron spin in an electric field E is at most $\theta_{spe}=(\gamma_n l/c^2)E$ again depending on the relative vector orientations. Here, c is the velocity of light.

Accordingly, the smallest detectable E-field $E_d$et is given by $E_{det}=c^2\theta_{spe}/\gamma_n l$. The phase uncertainty, i.e., the smallest measurable value of $\theta_{sp}$, delivered by methods of neutron polarimetry in current practice is in the range 0.1 mrad to 10 mrad. Taking 0.1 mrad as a baseline, a value of 1 mm for the characteristic length l, the estimated $E_d$et is approximately $5\times10^7$ V/m. For comparison, the maximum E-field inside a capacitor at its maximum rating is typically about $10^8$ V/r.

Hence, some limited electronic activity already falls, in principle, within range of the best of the existing technology for neutron polarimetry. Any significant improvement in the phase uncertainty, however, would greatly expand the applications for which neutron polarimetric EM-field detection, and particularly E-field detection, would be very useful and practical.

In fact, the effectiveness of neutron polarimetry for sensing spin precession of a neutron beam passing through a magnetic field has been demonstrated. However, spin precession in an electric field is a much weaker effect. That is because it relies on the effective magnetic field induced in the neutron's own frame of reference due to the neutron's relative motion, i.e., its motion relative to the "laboratory" frame in which the source of the electric field is stationary.

Until now, no technique has been proposed for measuring neutron spin precession in an electric field with enough sensitivity for practical applications in surveillance, diagnostics, imaging, and the like.

SUMMARY

A first aspect of the present invention is a method for measuring neutron spin precession in an electric field with high sensitivity suitable for practical applications in non-destructive testing, imaging, and the like. The method includes producing a neutron beam with a polarization vector P followed by transmitting the spin-polarized neutron beam through a sample region in which there is a target generating an electric field. The resultant transmitted neutron beam, having interacted with the target electric field, is then polarization-analyzing with an analyzing direction orthogonal to P. An intensity of the polarization-analyzed neutron beam is then detected and mapped to an electric field-strength value for the target electric field. A second aspect of the present invention corresponds to an apparatus for implementing this method.

In at least one embodiment of the present invention, an apparatus comprises a neutron source to produce a neutron beam, a spin polarizer to receive the neutron beam and to spin polarize the neutron beam such that the neutron beam has a polarization vector P, a spin analyzer to polarization-analyze the neutron beam after the neutron beam interacts with a target electric field (an analyzing direction of the spin analyzer being orthogonal to P), and a neutron detector to detect an intensity of the thus polarization-analyzed neutron beam and to output a corresponding detection signal.

In other apparatuses, the neutron source includes one of a neutron facility beamline, a cold neutron generator, a thermal generator, an epithermal neutron generator, or a thermal neutron generator from a moderated fast neutron source and the neutron beam is one of monochromatic or polychromatic; the spin polarizer includes one of a neutron supermirror or a He-3 cell; the polarization vector P is at least one of parallel, anti-parallel, or orthogonal to a direction of the neutron beam; the apparatus further comprises a magnetic guide field generator to produce a guide magnetic field and to guide the neutron beam to the target electric field; the magnetic guide field generator includes a solenoid coil; and the spin polarizer includes one of a neutron supermirror or a He-3 cell and the neutron detector includes one of a neutron supermirror or a He-3 cell.

In yet other apparatuses, the apparatus further comprises a magnetically-shielded sample chamber to hold a target generating the target electric field; the apparatus further comprises a mapper (the mapper to receive the detection signal and to convert the detection signal into a corresponding electric field magnitude of the target electric field); the apparatus further comprises one of a slit, a pair of orthogonal slits, or a pinhole at an exit of the neutron generator (the one of a slit, a pair of orthogonal slits, or a pinhole to define an imaging resolution of the apparatus); the neutron detector includes an imaging screen to generate scintillation photons upon absorbing the thus polarization-analyzed neutron beam and a camera to capture a two-dimensional image of the imaging screen (the two-dimensional image corresponding to the detection signal); and the apparatus further comprises a mapper (the mapper to receive the two-dimensional image and to at least one of convert the two-dimensional image into corresponding gray-scale values, convert the two-dimensional image into corresponding electric field magnitudes of the target electric field, or convert the two-dimensional image into a corresponding image for display).

In at least one embodiment of the present invention, a method comprises producing a spin-polarized neutron beam having a polarization vector P, transmitting the spin-polarized neutron beam through a sample region in which there is a target electric field (the spin-polarized neutron beam interacting with the target electric field), polarization-analyzing the transmitted neutron beam after the spin-polarized neutron beam interacts with the target electric field (a direction of the polarization-analyzing being orthogonal to P), and detecting an intensity of the polarization-analyzed neutron beam.

In other methods, the method further comprises guiding the spin-polarized neutron beam to the sample region with a guide magnetic field; the method further comprises mapping the thus detected neutron-beam intensity to a corresponding electric field magnitude of the target electric field; the polarization vector P is at least one of parallel, anti-parallel, or orthogonal to a direction of the spin-polarized neutron beam; and the sample region is contained within a magnetically shielded enclosure.

In yet other methods, detecting the polarization-analyzed neutron beam intensity is performed by an imaging apparatus that produces a two-dimensional array of neutron-beam intensity values and the method further comprises mapping the two-dimensional array of neutron-beam intensity values to at least one of corresponding gray-scale values, corresponding electric field magnitudes of the target electric field, or a corresponding image for display; the steps of producing a spin-polarized neutron beam, transmitting the spin-polarized neutron beam, polarization-analyzing the transmitted neutron beam, detecting an intensity of the polarization-analyzed neutron beam, and mapping the two-dimensional array produce a first data set, and the steps of producing a spin-polarized neutron beam, transmitting the spin-polarized neutron beam, polarization-analyzing the transmitted neutron beam, detecting an intensity of the polarization-analyzed neutron beam, and mapping the two-dimensional array are repeated with one of (1) a polarity of the target electric field being inverted or (2) the target electric field being turned off to thereby produce a second data set, the method further comprises subtracting the second data set from the first data set; and the steps of producing a spin-polarized neutron beam, transmitting the spin-polarized neutron beam, polarization-analyzing the transmitted neutron beam, detecting an intensity of the polarization-analyzed neutron beam, and mapping the two-dimensional array produce a first data set; and the steps of producing a spin-polarized neutron beam, transmitting the spin-polarized neutron beam, polarization-analyzing the transmitted neutron beam, detecting an intensity of the polarization-analyzed neutron beam, and mapping the two-dimensional array are repeated with one of (1) a second spin-polarized neutron beam having a polarization vector −P or (2) a direction of the polarization-analyzing being reversed to thereby produce a second data set and the method further comprises subtracting the second data set from the first data set.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings. The drawings are not to scale and are intended only to illustrate the elements of various embodiments of the present invention.

DETAILED DESCRIPTION

Figure 1:
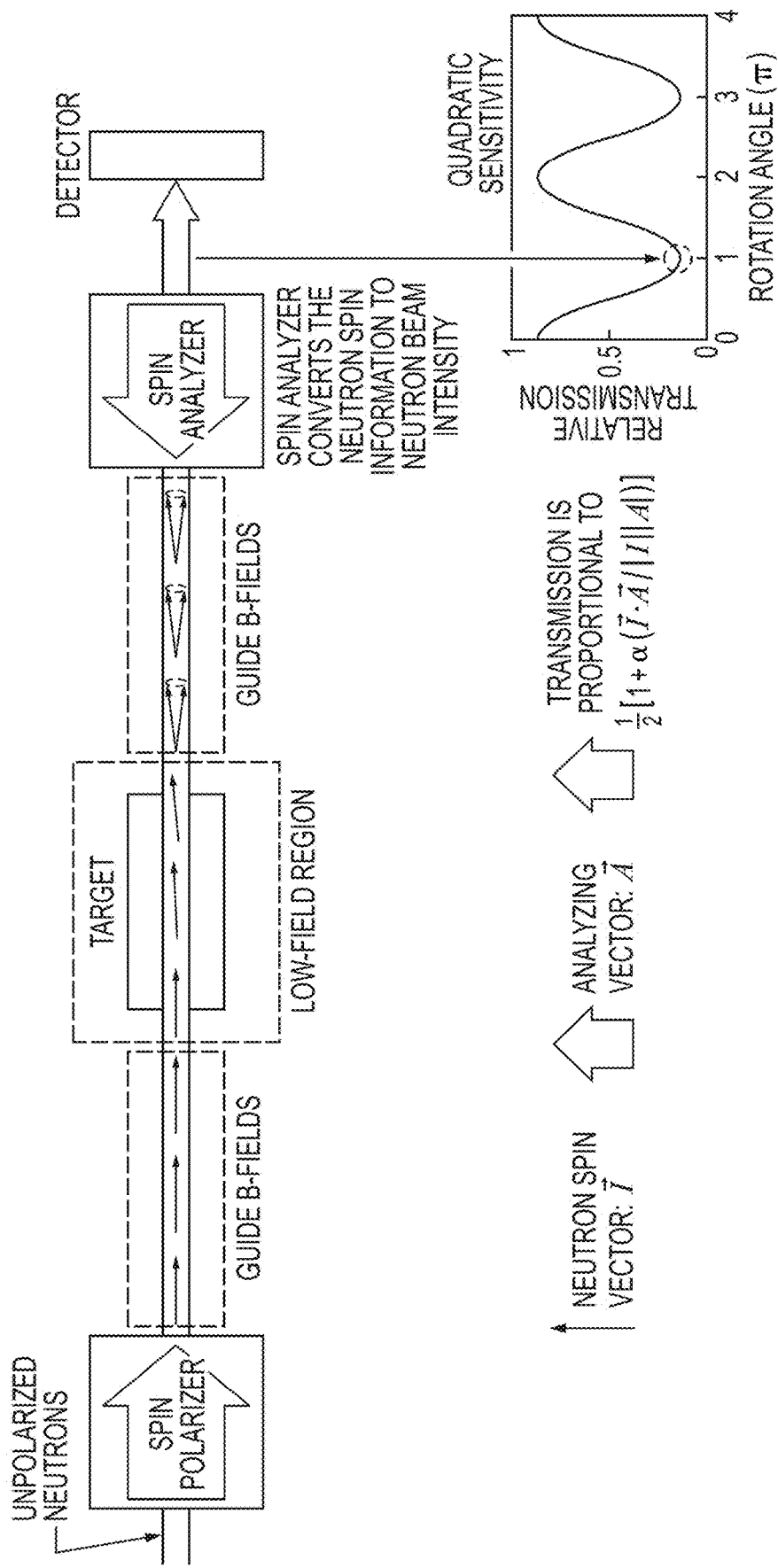
FIG. 1 illustrates a simplified block diagram of a typical arrangement known in the prior art for neutron polarimetry.

FIG. 1 illustrates a simplified block diagram of a typical arrangement of the prior art for neutron polarimetry. A spin polarizer, typically implemented by a neutron supermirror or He-3 cell, polarizes the neutron beam. The polarization vector of the neutron beam is then deliberately aligned to a guide magnetic field. The guide magnetic field illustrated in FIG. 1 lies along the propagation axis of the neutron beam.

A target or sample is placed within a low-field region. A weak magnetic bias field directed along the propagation axis within the low-field region helps to minimize undesired effects from ambient magnetic fields.

The purpose of the low-field region is to provide non-adiabatic neutron spin transport into the analyzer, as is required to achieve transverse analysis. This requires that the magnetic field existing between the sample and the analyzer must be weaker than $v_n/(\gamma_n l_{SA})$, where the unit of magnetic flux density is Tesla, $v_n$ (in meters per second) is the neutron velocity, $\gamma_n = 1.83 \times 10^8$ rad s$^{-1}$T$^{-1}$ is the gyromagnetic ratio of the neutron, and $I_{SA}$ (in meters) is the distance from the sample to the analyzer. Satisfying this criterion will avoid unwanted spin precession that can otherwise ruin the neutron spin-rotation signal in the measurement. By way of illustration, values of $v_n \approx 1000$ m/s and $I_{SA} \approx 0.2$ m, yield a maximum magnetic field of $\approx 3 \times 10^{-5}$ T, i.e., 0.3 Gauss.

As illustrated in the FIG. 1, interaction between the target and the neutron spins can cause the neutron spins to be tilted after passing through the target.

There is no precession when the neutron polarization is parallel to the guide magnetic field. However, the tilted neutron spins that exit from the low-field region precess about the guide magnetic field as they propagate toward the spin analyzer. Like the spin polarizer, the spin analyzer can be implemented by a neutron supermirror or He-3 cell.

Mathematically, the transmission of the neutron beam by the spin analyzer is proportional to the quantity, $$\tfrac{1}{2}\left[1 + \alpha\left(\vec{I} \cdot \vec{A}/|I||A|\right)\right],$$

where I is the neutron spin vector, A is the analyzing vector, and a is a factor, less than 1, to account for detection efficiency and other losses.

Accordingly, the transmission of the neutron beam by the spin analyzer is determined by the inner product between the neutron spin vector and the analyzing vector. A conventional polarimeter is longitudinal; that is, the spin analyzing direction is parallel or antiparallel to the original neutron polarization. The inner product is therefore proportional to the cosine of the tilt angle. If, as is typical, the spin polarization is tilted through only a small angle by its interaction with the target, the cosine function will be approximately quadratic. Hence, for small tilting angles, the response of the polarimeter will be quadratic in the tilting angle, as illustrated in the inset in the lower right portion of FIG. 1.

This affects the sensitivity of the measurement in the following way: A reasonable assumption is that the detection signal-to-noise-ratio (SNR) is limited purely by the counting statistics or shot-noise limit. In this case, the SNR is proportional to N, where N is the number of neutron counts at the detector. One can define 0 as the smallest detectable rotation angle of the neutron spin. At the measurement threshold, the response is equal to 1/SNR. Because the small-angle response is quadratic, the result is that $\Phi^2 \sim 1/\sqrt{N}$, from which it follows that $\Phi \sim 1/N^{1/4}$, i.e., the resolution varies inversely as the fourth root of the neutron count.

This very weak dependence makes it very challenging to improve the angular resolution of conventional longitudinal polarimetry by simply increasing the neutron flux. For example, if it takes one day to achieve an angular resolution of 10 mrad, it will take an impractical timespan of 10,000 days to achieve an angular resolution of 1 mrad.

At least one embodiment of the present invention overcomes this obstacle by employing orthogonal polarimetry. With this orthogonal approach, the initial neutron polarization is orthogonal to the analyzing direction. Under that arrangement, the response of the polarimeter is proportional to the sine of the tilt angle, which for small spin rotations is linear in the tilt angle, as illustrated in the inset in the lower right portion of FIG. 2. It follows that $\Phi \sim 1/N^{1/2}$, or, in other words, the resolution varies as the square root of the neutron count.

If longitudinal polarimetry took, e.g., 10,000 days to achieve 1-mrad resolution, it is estimated that under the same neutron flux conditions, orthogonal polarimetry would take only 864 seconds to achieve the same resolution.

The above description of the neutron polarimeter makes no assumptions about the specific nature of the sample or target. In particular, the above description is not limited to any particular type of interaction between the target and the neutron spin. However, very high resolutions are needed for practical measurement of the interaction between the neutron spin and an electric field. As explained in greater detail below, orthogonal polarimetry makes it possible to achieve such very high resolutions. Consequently, the measurement of E-fields by neutron polarimetry is now a practical possibility.

More specifically, the resolution of various embodiments of the present invention varies as the square root of the neutron count, rather than the fourth root as in current approaches. Because of this heightened sensitivity, much more significant gains are possible, even through such simple adjustments as increasing the neutron flux, increasing the data acquisition time, and making improvements in instrumental parameters such as the beam aperture and the detector efficiency.

Although the orthogonal scheme of neutron polarimetry is known in the art, applications of that scheme to neutron metrology have seldom been reported. This is due, at least in part, to a widespread belief that orthogonal polarimetry requires a high degree of neutron polarization to be maintained over the entire beam path. This, in turn, dictates tight constraints on the B-field along the beam path, which significantly complicate the system design.

For example, approaches reported in earlier work have involved manipulating the neutron spin in the beam path. This required the use of monochromatic neutron beams and superconducting shields so that the magnetic fields could be controlled precisely.

Further, cryostats for the magnetic shielding are cumbersome and because they have limited capacity, they can only accommodate targets of a very limited size.

In contrast, with one or more embodiments of the present invention, even a simple implementation of orthogonal polarimetry could produce useful results without any additional neutron spin manipulation along the beam path and, indeed, without painstaking control of the B-fields that affect neutron transport.

Figure 2:
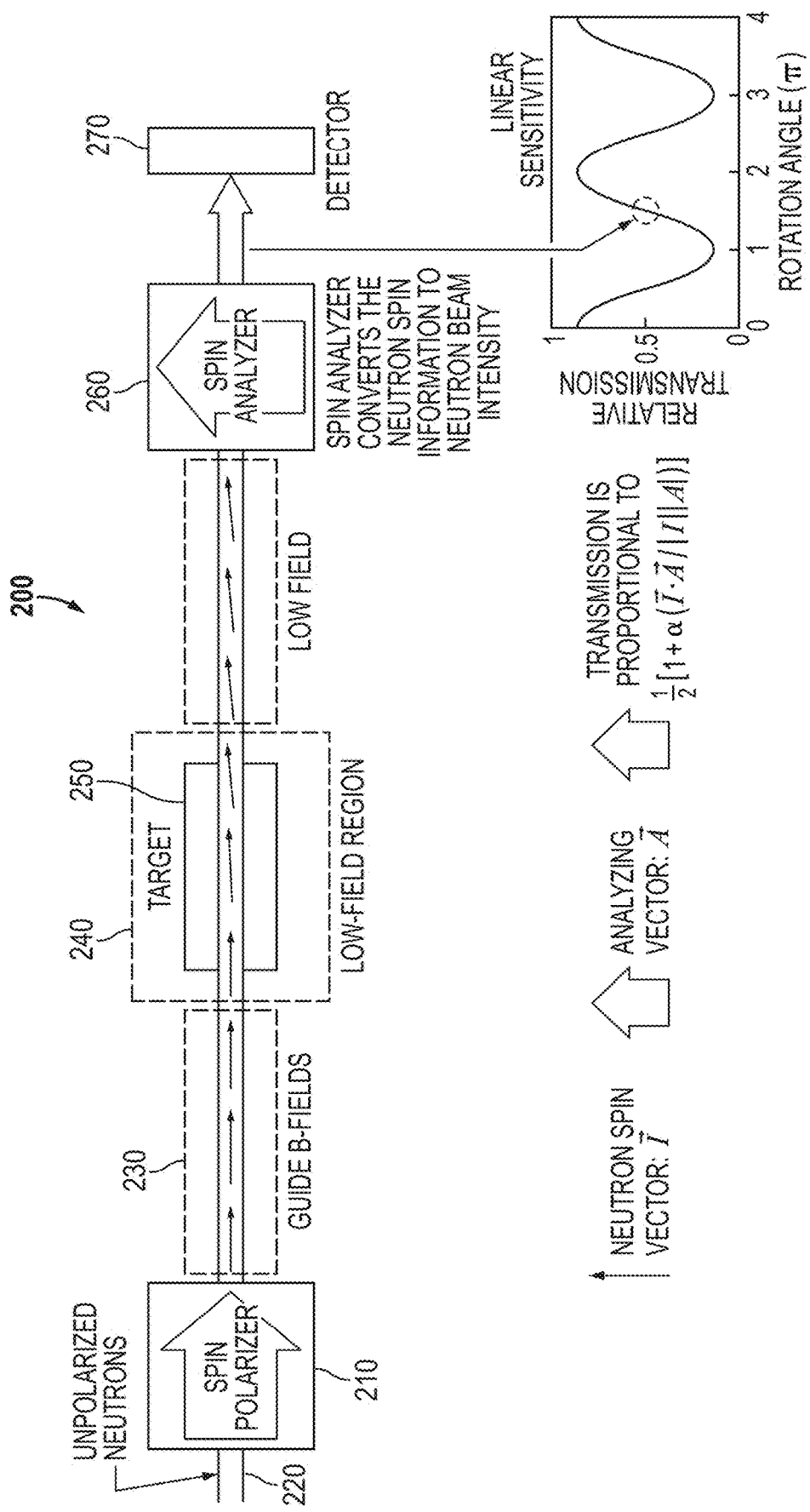
FIG. 2 illustrates a simplified block diagram of a new arrangement for an orthogonal polarimeter in accordance with at least one embodiment of the present invention.

FIG. 2 illustrates a simplified block diagram of an orthogonal polarimeter 200 in accordance with one embodiment of the present invention. As in the arrangement of FIG. 1, a spin polarizer 210 polarizes the neutron beam 220 from a neutron source (not illustrated) to have a polarization vector P. The neutron source, which may produce either a fast or a slow neutron beam, may, for example, be a neutron facility beamline, a cold neutron generator, a thermal generator, an epithermal neutron generator, or a thermal neutron generator from a moderated fast neutron source. The polarization vector P is parallel to a direction of the propagation axis of the neutron beam 220, which is also parallel to a guide magnetic field 230. As will be appreciated by one of skill in the art, the guide magnetic field 230 is only required for a slow, i.e., cold or thermal, neutron beam. The guide magnetic field 230, generated by a guide magnetic field generator (not illustrated), is required only up to a magnetically-shielded sample chamber 240. The guide magnetic field generator may, for example, be a solenoid coil. A target, i.e., a sample to be tested, 250, is placed within a magnetic low-field region created by the magnetically-shielded sample chamber 240, in which a weak magnetic bias field is directed along the propagation axis of the neutron beam 220.

The neutron beam 220, having interacted with the target 250, then passes to a spin analyzer 260. In contrast to FIG. 1, however, the spin analyzer 260 has a spin analyzing direction that is orthogonal to the propagation axis of the neutron beam 220, i.e., it is orthogonal to the original polarization vector P. The spin analyzer 260 may, for example, be implemented with a He-3 cell placed within a transverse solenoid, i.e., a solenoid whose axis is perpendicular to the propagation axis of the neutron beam 220. The He-3 cell and solenoid may be shielded from magnetic fields by placing the spin analyzer 260 within a mu-metal enclosure (not illustrated). After being spin analyzed by the spin analyzer 260, the neutron beam 220 is detected by a neutron detector 270. The neutron detector 270 may, for example, be a He-3 detector or a scintillator screen. The output from the neutron detector 270 may be processed by a mapper (not illustrated) to generate a gray-scale value. The mapper may also, for example, convert the gray-scale value to corresponding electric field magnitude for the E-field generated by the target 250.

It should be noted in this regard that with various embodiments of the present invention, the direction of neutron polarization is not required to lie in the same direction as the propagation axis of the neutron beam 220. Specifically, the direction of neutron polarization vector P can be orthogonal, parallel, or anti-parallel to the propagation axis of the neutron beam 220. In each case, however, the direction of the neutron polarization vector P should be orthogonal to the spin analyzing direction.

A proof-of-principle experiment for orthogonal polarimetry in accordance with one or more embodiments of the present invention is described below. It is reported in greater detail in Y.-Y. Jau et al., "Sensitive neutron transverse polarization analysis using a $^3$He spin filter," Review of Scientific Instruments, vol. 91, art. no. 073303 (2020), the contents of which are incorporated herein by reference.

Briefly, an arrangement substantially as illustrated in FIG. 2 was driven by a monochromatic slow neutron beam 220 with a wavelength of 4.1 A and a relatively low flux of several hundred counts per second. The neutron counts dropped by about half after 1.5 days, due to the relaxation of the He-3 polarization inside the spin polarizer 210 and the spin analyzer 260.

As those skilled in the art will appreciate, whether a neutron beam is "monochromatic" or "polychromatic" depends on the coherence length, relative to the needs of the particular application for which the neutron beam is being used. In the present context, the beam is monochromatic, or "narrowband," if the linewidth is no more than a few percent of the central wavelength, for example, less than 10%. Also in the present context, the beam is polychromatic, or "broadband," if the linewidth is similar to or greater than the central wavelength, for example, more than 80% of the central wavelength.

A spin-flip coil was used as the target 250. Because the spin-flip coil could controllably rotate the neutron spin away from the longitudinal direction, one could determine the minimum spin angle that could be resolved. After calibrating the spin-flip coil for rotation versus driving current, the spin-flip coil was used it to tilt the neutron spin at ±20 mrad and at ±2 mrad in a square waveform.

The experiment confirmed that for a data acquisition time of 50,000 seconds (i.e., about fourteen hours) and a neutron flux below 1000 counts per second, the orthogonal polarimeter 200 could measure spin-rotation angle with a sensitivity better than about 0.5 mrad. This is a benchmark that cannot be achieved by the existing longitudinal polarimetry schemes.

The sensitivity was limited primarily by the counting statistics. The spin-angle resolution was approximately 112 mrad/(number of counts)$^{1/2}$. Extrapolation from FIG. 2 predicts that with a neutron flux of one million counts per second, a spin-angle resolution of 0.4 μrad could be achieved with a data acquisition time of one day.

The experiment also showed that the orthogonal polarimeter 200 could be effective even when using a broadband slow neutron beam 220, provided the spin-rotation angle to be measured was substantially less than 1 radian.

The above described a non-imaging approach to neutron polarimetry in general, and more particularly to neutron polarimetry for E-field measurement. Various embodiments of the present invention may also be used for imaging by employing beams of spin-polarized neutrons to create images of E-fields. An imaging orthogonal polarimeter 300, in accordance with one embodiments of the present invention, is described below with reference to FIG. 3.

The components of the imaging orthogonal polarimeter 300 are as illustrated in FIG. 2, except that an imaging screen 310 is shown in place of the spin analyzer 260 of FIG.

Figure 3:
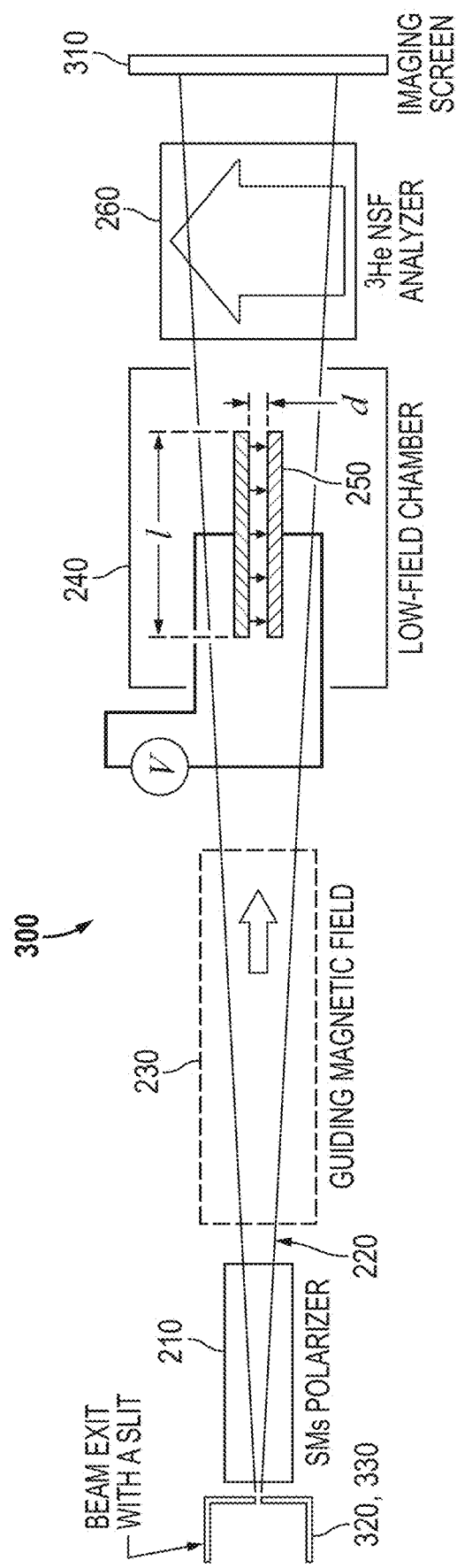
FIG. 3 illustrates a simplified block drawing of a neutron imaging system in accordance with at least one embodiment of the present invention.

2. As illustrated in FIG. 3, a parallel-plate capacitor with plate length/in the longitudinal direction and plate separation d, connected to a charging voltage V is used as the target 250.

In an example implementation of the imaging orthogonal polarimeter 300, a 300-μm-thick LiF:ZnS imaging screen 310 generates scintillation photons that are proportional to the neutron intensity. A vertical imaging resolution of, for example, about 1 mm can be set by placing an 11-mm-wide slit 320 at the beam exit from the neutron source 330 and placing the target 250 7 meters from the beam exit of the neutron source 330 and 55 cm from the imaging screen 310. The horizontal imaging resolution can be set in an analogous fashion. The vertical and horizontal imaging resolutions can be set simultaneously using a pair of orthogonal slits or a pinhole. The imaging screen 310 is optically coupled to a scientific CMOS camera (not illustrated) for capturing a two-dimensional image of the imaging screen 310. The pixel values captured by the camera may be processed by a mapper (not illustrated) to generate gray-scale values. The mapper may also, for example, convert the gray-scale values to corresponding electric field magnitudes for the E-field generated by the target 250, or generate a corresponding image for display.

The neutron intensity $\mathcal{J}(\theta)$ on the imaging screen 310 is proportional to a function of θ, which here represents the projection of the spin-rotation vector onto the analyzing direction, according to the expression, $\mathcal{J}(\theta) \propto N_0(1+\overline{P_n A} \cdot \sin\theta)$. $N_0$ is the detected neutron number within a given area on the imaging screen 310, $\overline{P_n A}$ (which is less than 1) is the averaged product of the neutron polarization $P_n$ and the analyzing power A of the spin analyzer 260 averaged over the range of neutron wavelengths in the neutron beam 220 (here assumed to be polychromatic). The angle θ is a sum of contributions from precession in the E-field and precession in a background B-field, the latter of which may be assumed to be small.

It is noteworthy that reversing the direction of the target E-field will reverse the direction of the induced neutron precession. Thus, assuming precession due to the background B-field can be neglected, reversing the E-field will reverse the sign of the term that is linear in sin θ in the above expression for $\mathcal{J}(\theta)$. Hence, image areas corresponding to regions of high E-field may appear in either positive or negative contrast, depending on the direction of the E-field. This effect can be utilized to increase the overall contrast of an image assembled from multiple frames. That is, reversing the direction of the precession between frames will result in alternating positive and negative contrast. The overall contrast can then be enhanced by taking differences between successive frames, i.e., data sets, thereby canceling various sources of noise.

The direction of the precession can also be reversed by reversing the polarization vector of the neutron beam 220, or by reversing the analyzing direction of the spin analyzer 260. The latter two techniques require control only of the imaging orthogonal polarimeter 300, and do not require any control of the E-field in the target 250.

A proof-of-principle experiment confirmed that the imaging orthogonal polarimeter 300 operated as expected. The experiment is described briefly below. It is reported in greater detail in Y.-Y. Jau et al., "Electric Field Imaging Using Polarized Neutrons," Physical Review Letters, vol. 125, art. no. 110801 (2020), the contents of which are incorporated herein by reference.

In the proof-of-principle experiment, a slow neutron beam 220 of unpolarized polychromatic neutrons, primarily in the wavelength range 0.2 nm to 0.6 nm, was transmitted through the slit 320 and then through the spin polarizer 210. The polarized neutrons were then adiabatically transferred into a longitudinal guide magnetic field 230 having a strength of approximately 1 mT. The polarized neutrons then entered the magnetically-shielded sample chamber 240, where they passed through the electric field between the electrodes, i.e., the two parallel capacitor plates, of the target 250.

In the experiment, the guide magnetic field 230 changed in orientation from a vertical direction at the neutron supermirror employed as the spin polarizer 210 to a longitudinal direction at the longitudinal spin analyzer 260. The term "adiabatic," as used here, means that the neutron spin orientation followed the magnetic field lines from the vertical to the longitudinal orientation. For this to happen, it is necessary that the rate of change of the magnetic field orientation seen by the moving neutron must be slower than the rate of neutron spin precession determined by the local magnetic field.

During the experiment, images of two different targets 250 were made, referred to as the long version sample and the short version sample. Each target 250 had a pair of rectangular, borated aluminum electrodes enclosed in a body of perfluoroalkoxy (PFA) and separated by a PFA membrane as the dielectric layer. PFA was a desirable material because it has a high dielectric strength and a relatively high neutron transmission with low scattering. In the long-version sample, the electrodes were 5 cm wide, 6.35 mm thick, and 11.4 cm long, with a spacing of 400±50 μm. In the short version sample, the electrodes were 5 cm wide, 6.35 mm thick, and 5.7 cm long, with a spacing of 500±50 m.

To enhance the image quality, multiple sequential images were taken with the voltage source alternating between an ON state at 35 kV or −35 kV and an OFF state. The frame exposure time was 45 s. Each image was the result of the median combination of three frames. A contrast image was then generated from each ON-OFF image pair. For an ON image Im(ON) and an OFF image Im(OFF), the contrast image is obtained from the operation (Im(ON)−Im(OFF))/Im(OFF). The contrast images were then averaged to obtain better statistics.

Figure 4:
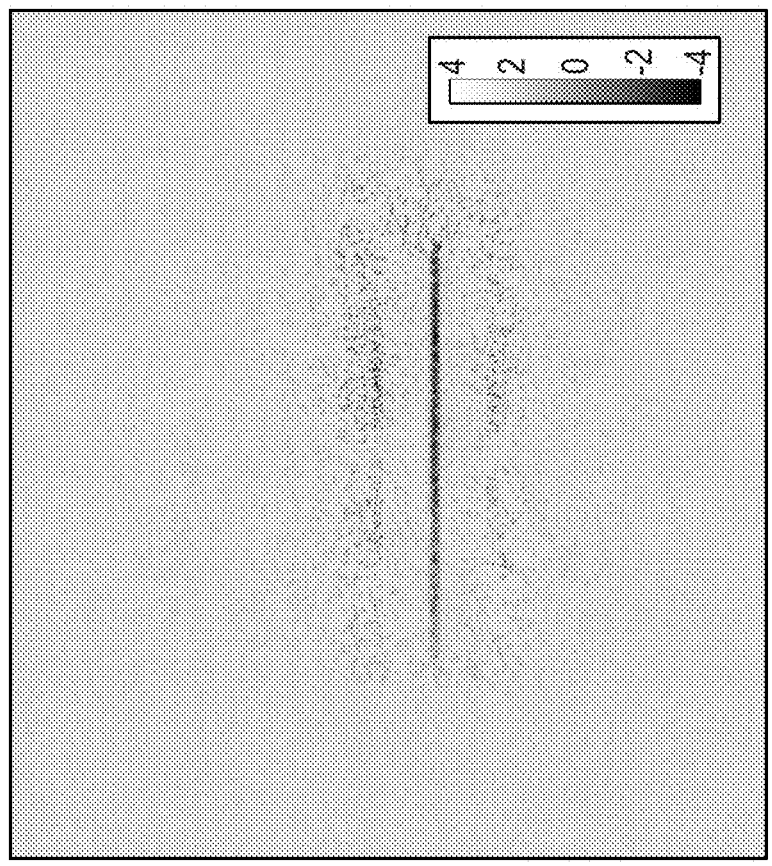
FIG. 4 illustrates an example neutron image and electric field image produced with the imaging system of FIG. 3.
Figure 4:
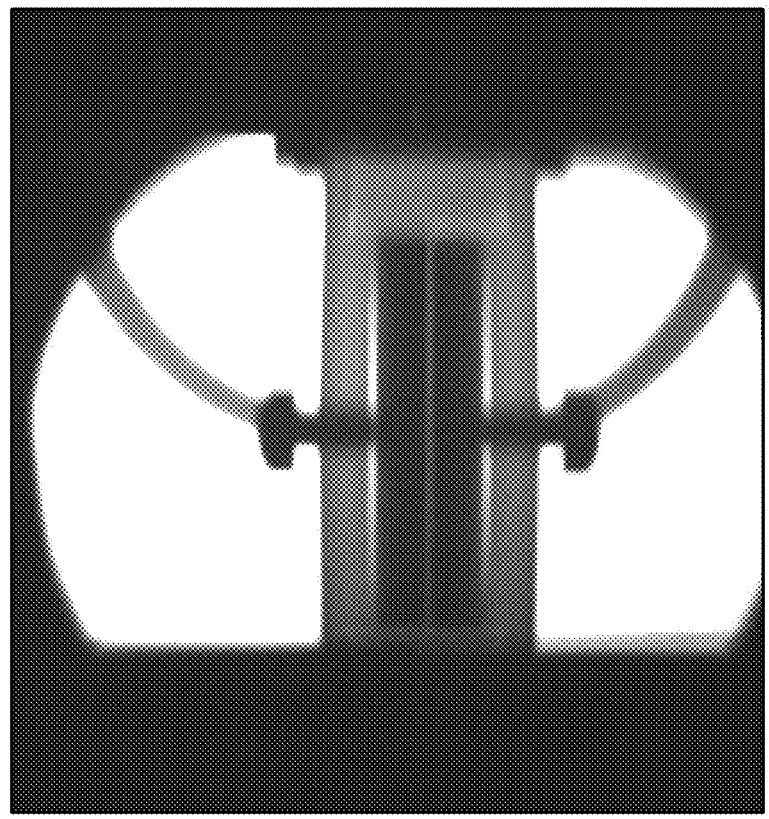

The experiments using the short version sample with a driving voltage of −35 kV yielded the best statistics because a long averaging time was used. For these experiments, using 1172 averaged images, a shot-noise-limited angular resolution of 0.12 mrad was determined. This implies a minimum detectable field of about $10^6$ V/m. An example neutron image of the short version sample is provided in FIG. 4.

It is believed that significantly better performance can be obtained through optimization of experimental parameters. For example, by increasing the neutron transmission of the target 250, the primary aperture size of the neutron source 330, and the efficiency of the spin polarizer 210, an increase on the order of a hundredfold in the neutron fluence may be achieved. Further, employing beam focusing may potentially add a further improvement of two more orders of magnitude, yielding a total detected neutron fluence on the order of $10^4$ cm$^{-2}$ in a data acquisition period of one day. For fluences at this level, it is estimated that the minimally detectable E-field strength at a resolution of 1 cm$^3$ would be approximately $5 \times 10^4$ V/m and, trading sensitivity for higher volumetric resolution, that the minimally detectable E-field strength at a resolution of 1 mm$^3$ would be approximately $5 \times 10^6$ V/m. Sensitivities at these levels should suffice for imaging diagnostics applied, for example, to high-voltage electronics, where capacitors have typical internal E strengths exceeding $10^7$ V/m, to dielectric materials subjected to very high external E-fields, and to ferroelectric materials, where spontaneous electric polarizations may have equivalent E-field strengths exceeding $10^8$ V/m.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
    a neutron source adapted to produce a neutron beam;
    a spin polarizer adapted to receive the neutron beam and to spin polarize the neutron beam such that the neutron beam has a polarization vector P;
    a spin analyzer adapted to polarization-analyze the neutron beam after the neutron beam interacts with a target electric field, an analyzing direction of the spin analyzer being orthogonal to P; and
    a neutron detector adapted to detect an intensity of the thus polarization-analyzed neutron beam and to output a corresponding detection signal.

2. The apparatus of claim 1,
    wherein the neutron source includes one of a neutron facility beamline, a cold neutron generator, a thermal generator, an epithermal neutron generator, or a thermal neutron generator from a moderated fast neutron source; and
    wherein the neutron beam is one of monochromatic or polychromatic.

3. The apparatus of claim 1, wherein the spin polarizer includes one of a neutron supermirror or a He-3 cell.

4. The apparatus of claim 1, wherein the polarization vector P is at least one of parallel, anti-parallel, or orthogonal to a direction of the neutron beam.

5. The apparatus of claim 1, further comprising a magnetic guide field generator adapted to produce a guide magnetic field and to guide the neutron beam to the target electric field.

6. The apparatus of claim 5, wherein the magnetic guide field generator includes a solenoid coil.

7. The apparatus of claim 1,
    wherein the spin polarizer includes one of a neutron supermirror or a He-3 cell; and
    wherein the neutron detector includes one of a neutron supermirror or a He-3 cell.

8. The apparatus of claim 1, further comprising a magnetically-shielded sample chamber adapted to hold a target generating the target electric field.

9. The apparatus of claim 1, further comprising a mapper, the mapper adapted to receive the detection signal and to convert the detection signal into a corresponding electric field magnitude of the target electric field.

10. The apparatus of claim 1, further comprising one of a slit, a pair of orthogonal slits, or a pinhole at an exit of the neutron generator, the one of a slit, a pair of orthogonal slits, or a pinhole adapted to define an imaging resolution of the apparatus.

11. The apparatus of claim 10, wherein the neutron detector includes:
    an imaging screen adapted to generate scintillation photons upon absorbing the thus polarization-analyzed neutron beam; and
    a camera adapted to capture a two-dimensional image of the imaging screen, the two-dimensional image corresponding to the detection signal.

12. The apparatus of claim 11, further comprising a mapper, the mapper adapted to receive the two-dimensional image and to at least one of convert the two-dimensional image into corresponding gray-scale values, convert the two-dimensional image into corresponding electric field magnitudes of the target electric field, or convert the two-dimensional image into a corresponding image for display.

13. A method, comprising:
    producing a spin-polarized neutron beam having a polarization vector P;
    transmitting the spin-polarized neutron beam through a sample region in which there is a target electric field, the spin-polarized neutron beam interacting with the target electric field;
    polarization-analyzing the transmitted neutron beam after the spin-polarized neutron beam interacts with the target electric field, a direction of the polarization-analyzing being orthogonal to P; and
    detecting an intensity of the polarization-analyzed neutron beam.

14. The method of claim 13 further comprising guiding the spin-polarized neutron beam to the sample region with a guide magnetic field.

15. The method of claim 13 further comprising mapping the thus detected neutron-beam intensity to a corresponding electric field magnitude of the target electric field.

16. The method of claim 13, wherein the polarization vector P is at least one of parallel, anti-parallel, or orthogonal to a direction of the spin-polarized neutron beam.

17. The method of claim 13, wherein the sample region is contained within a magnetically shielded enclosure.

18. The method of claim 13,
    wherein detecting the polarization-analyzed neutron beam intensity is performed by an imaging apparatus that produces a two-dimensional array of neutron-beam intensity values; and
    the method further comprising mapping the two-dimensional array of neutron-beam intensity values to at least one of corresponding gray-scale values, corresponding electric field magnitudes of the target electric field, or a corresponding image for display.

19. The method of claim 18,
    wherein the steps of producing a spin-polarized neutron beam, transmitting the spin-polarized neutron beam, polarization-analyzing the transmitted neutron beam, detecting an intensity of the polarization-analyzed neutron beam, and mapping the two-dimensional array produce a first data set;
    wherein the steps of producing a spin-polarized neutron beam, transmitting the spin-polarized neutron beam, polarization-analyzing the transmitted neutron beam, detecting an intensity of the polarization-analyzed neutron beam, and mapping the two-dimensional array are repeated with one of (1) a polarity of the target electric field being inverted or (2) the target electric field being turned off to thereby produce a second data set;
    the method further comprising subtracting the second data set from the first data set.

20. The method of claim 18,
    wherein the steps of producing a spin-polarized neutron beam, transmitting the spin-polarized neutron beam, polarization-analyzing the transmitted neutron beam, detecting an intensity of the polarization-analyzed neutron beam, and mapping the two-dimensional array produce a first data set;
wherein the steps of producing a spin-polarized neutron beam, transmitting the spin-polarized neutron beam, polarization-analyzing the transmitted neutron beam, detecting an intensity of the polarization-analyzed neutron beam, and mapping the two-dimensional array are repeated with one of (1) a second spin-polarized neutron beam having a polarization vector −P or (2) a direction of the polarization-analyzing being reversed to thereby produce a second data set;
the method further comprising subtracting the second data set from the first data set.

* * * * *